Aug. 13, 1940.     W. F. BOLDT ET AL     2,211,403
MEANS FOR ROTATING PISTON PACKING CUPS
Filed Feb. 19, 1938

INVENTORS
WERNER F. BOLDT
WALTER R. FREEMAN
BY
THEIR ATTORNEY.

Patented Aug. 13, 1940

2,211,403

UNITED STATES PATENT OFFICE 2,211,403

MEANS FOR ROTATING PISTON PACKING CUPS

Werner F. Boldt, Overland, and Walter R. Freeman, University City, Mo., assignors to Wagner Electric Corporation, St. Louis, Mo., a corporation of Delaware Application February 19, 1938, Serial No. 191,366

6 Claims. (Cl. 60—54.6)

Our invention relates to fluid compressors and more particularly to fluid compressors of the compensating type which are employed, for example, in hydraulically-actuated brakes.

These compressors (commonly referred to as "master cylinders", employ a packing cup for sealing the piston and in the form now in use in braking apparatus a porthole places the portion of the cylinder ahead of the piston in communication with a reservoir when the piston is in retracted position, whereby contraction and expansion of the fluid in the braking system due to temperature changes will not cause decrease or increase of pressure in the system.

When the piston is initially operated, a fluid pressure is developed in the cylinder ahead of the piston and packing cup and as the forward edge of the lip of the cup becomes partially positioned over the porthole, the lip will be forced sufficiently into the hole that the forward edge of the cup will rub on the forward edge of the hole as the cup continues to move forwardly. Since in apparatus now in commercial use the same portion of a cup may pass over the porthole on many successive protractile strokes of the piston, a chafing or cutting of the cup frequently results, thus reducing the length of its effective service.

It is one of the objects of our invention to provide means whereby the same portion of the packing cup will not pass the porthole on every protractile stroke of the piston and thus to distribute the "wearing" action of the porthole over the periphery of the cup instead of permitting it to be concentrated at one point.

A specific object of our invention is to provide means controlled by movement of the piston for intermittently imparting a slight rotative movement to the piston packing cup.

Figure 1:
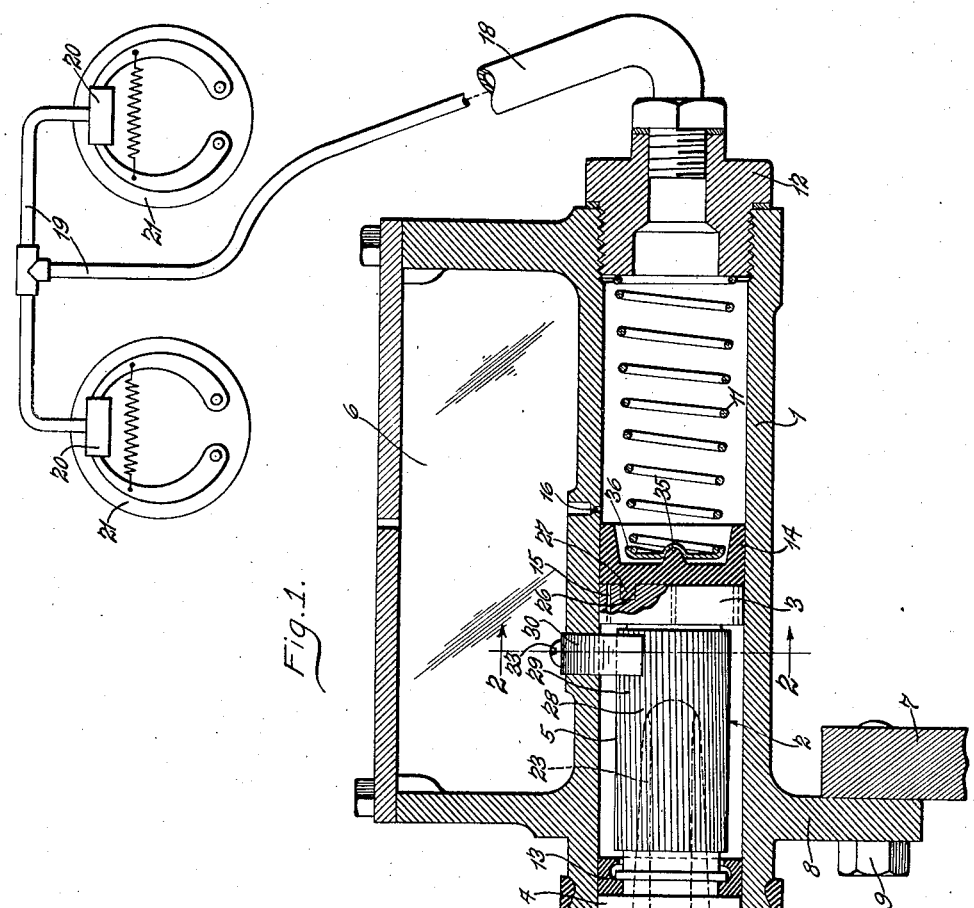
Figure 2:
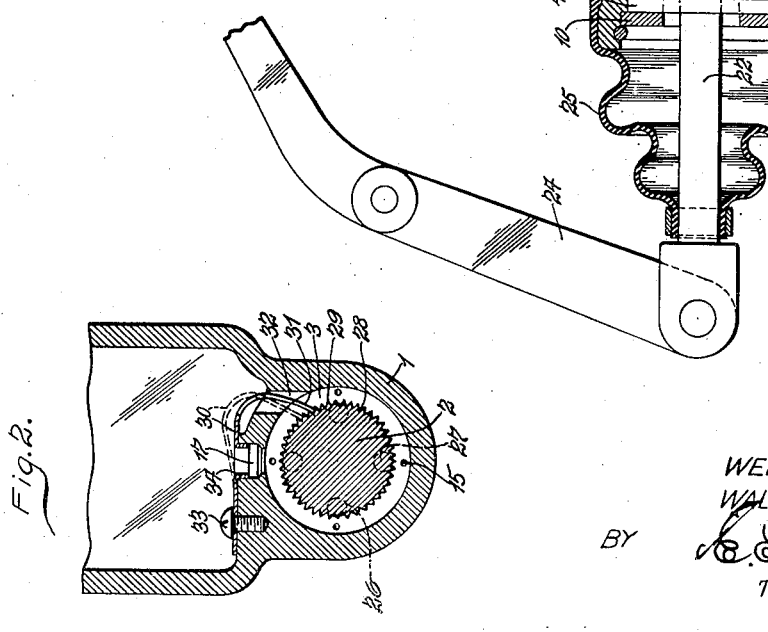

Other objects of our invention will become apparent from the following description taken in connection with the accompanying drawing in which Figure 1 is a longitudinal cross-sectional view, partly in elevation, of a master cylinder embodying our invention, said figure also diagrammatically showing a brake mechanism as an example of apparatus which may be actuated thereby; and Figure 2 is a cross-sectional view taken on the line 2—2 of Figure 1.

Referring to the drawing in detail, the numeral 1 indicates a cylinder in which is reciprocable a piston 2 having a head 3, a rear flange 4, and an intermediate reduced cylindrical portion 5. Above the cylinder is a reservoir 6 cast integral with the cylinder and the cylinder is secured to a suitable support 7 by means of a flange 8 and a bolt 9.

The rear portion 4 of the piston is adapted to engage a stop 10 to predetermine its normal inoperative position to which it is normally biased by a spring 11 interposed between the head of the piston and a plug 12 forming the forward end of the cylinder. The rear end of the cylinder adjacent the portion 4 is provided with a suitable annular rubber packing element 13 to prevent leakage of fluid from the space surrounding the reduced cylindrical portion 5. The head 3 of the piston has associated therewith a packing cup 14 for preventing fluid from passing the piston head on the protractile stroke of the piston. The piston and cup, however, are so constructed that fluid may pass the lip of the cup during the retractile stroke of the piston and to facilitate this, the piston head 3 is formed with a plurality of passages 15 adjacent its periphery.

When the piston is in retracted position, as shown in Figure 1, the compensating porthole 16 places the reservoir in communication with the portion of the cylinder ahead of the piston. A passageway 17 (see Figure 2) is also provided between the reservoir and the portion of the cylinder at the rear of the head of the piston in order that the space surrounding the reduced cylindrical portion 5 of the piston may always be filled with fluid.

The forward end of the cylinder is connected by a suitable conduit 18 to the conduits 19 leading to the actuating cylinders 20 of the brake assemblies 21 (only two being diagrammatically shown). The piston 2 is actuated by a piston rod 22 which is received by a socket 23 in the piston and the rear end of the piston rod is pivotally connected to a brake pedal 24. The rear end of the cylinder is shown as enclosed by a dust excluding boot 25.

In compensators of the type described, the compensating porthole 16 is kept as small as possible but for reasons already pointed out the inner edge thereof causes considerable chafing or cutting of the lip of cup 14 as the cup is moved forwardly over the open end of the port. This chafing and cutting of the cup at one particular point results in a short life for the cup which would be considerably prolonged if this chafing or cutting could be eliminated or the effect thereof distributed over the cup.

In accordance with our invention, we provide means for rotating the packing cup relative to the cylinder wall, thus preventing the same portion of the lip of the cup from passing the porthole during every stroke of the piston. The head 3 of the piston is provided with a plurality of recesses 26 and the rear surface of the packing cup 14 is formed with a like number of projections or prongs 27 which are adapted to snugly fit into the recesses, thus so connecting the cup with the piston that any rotation of the piston will also cause rotation of the cup. The reduced cylindrical portion 5 is provided with spiral grooves 28, thereby forming spiral teeth 29 each of which is at a slight angle to a longitudinal plane passing through the axis of the piston. A steel leaf spring 30 is mounted on the reservoir side of the cylinder wall and has a portion 31 extending through a passageway 32 and forming a detent for engaging a groove 28 on the side of the cylindrical portion 5 of the piston. The spring is secured to the cylinder by a screw 33 and is guided by a portion 34 received in the passage 17. The forward side of the packing cup is formed with a protuberance 35 for receiving a plate 36 against which spring 11 abuts, thus permitting the cup to be rotated quite freely with respect to the spring.

In the construction just described, when the piston is moved forward, the detent end 31 of the spring will jump one or more of the teeth 29 depending upon the extent of forward movement of the piston, the latter being prevented from rotation under these conditions as a result of the fluid pressure acting on the cup and causing its lip to frictionally engage the cylinder wall. When the piston is permitted to return to its retracted position, the detent end of the spring will ride the groove in which it has become positioned and because of the spiral arrangement of the groove, the spring will be forced upward to the position indicated by the dotted lines in Figure 2. This movement of the piston will result in the spring being cocked, that is, deformed from its normal position and energy stored therein. When the piston has reached its retracted position against the stop 10, porthole 16 will be uncovered and the fluid pressure on the lip of the cup will be released, thereby freeing the piston so it can be rotated. The energy stored in the spring will now be effective to cause the piston to rotate, the extent of which rotation will be determined by the number of teeth the detent end of the spring has jumped during the protractile stroke of the piston. It is thus seen that upon a sufficient protractile and retractile stroke of the piston, the piston, and consequently the packing cup, will be rotated. This results in a different portion of the lip of the cup being positioned for movement past the porthole upon the next protractile stroke of the piston.

Being aware of the possibility of modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. In apparatus of the class described, a cylinder, a piston reciprocable in said cylinder, a packing cup associated with the head of the piston, a fluid reservoir, means including a passage in the cylinder wall and positioned ahead of the cup when the piston is in retracted position for permitting communication between the reservoir and the cylinder, and means operatively engaging the piston for rotating the packing cup relative to the cylinder and to a new position when the piston assumes a retracted position whereby the same portion of the cup will not move past the open end of the passage on all successive strokes of the piston, said means being caused to be operative as a result of reciprocation of the piston.

2. In fluid pressure apparatus of the class described, a cylinder, a piston reciprocable in said cylinder, a packing cup associated with the head of the piston, a fluid reservoir, means including a passage in the cylinder wall and positioned ahead of the cup when the piston is in retracted position for permitting communication between the reservoir and the cylinder, and means including a ratchet device comprising a yieldable pawl for rotating the packing cup relative to the cylinder and to a new position whereby the same portion of the cup will not move past the open end of the passage on all successive strokes of the piston, said ratchet device being caused to be operative by a reciprocation of the piston and effective to rotate the packing cup when fluid under pressure is not effective thereon.

3. In a fluid compressor, a cylinder, a piston reciprocable in said cylinder and formed with a head portion and a cylindrical portion at the rear of the head portion, a packing cup connected to the piston head for rotation therewith, a fluid reservoir, means including a passage in the cylinder wall and positioned ahead of the cup when the piston is in retracted position for permitting communication between the reservoir and the cylinder, means forming spiral teeth in spaced relation on the surface of the cylindrical portion of the piston, and a resilient pawl carried by the cylinder for cooperating with the teeth in such a manner that upon forward movement of the piston the pawl will move from its cooperating relation with one tooth to that of another tooth and upon rearward movement of the piston it will be so deformed that the energy stored therein will rotate the piston when the piston assumes retracted position and the fluid pressure on the packing cup is relieved through the passage.

4. In apparatus of the class described, a cylinder, a piston reciprocable in said cylinder, a packing cup secured against relative rotation to the head of the piston, and means comprising a spring for rotating the piston and cup relatively to the cylinder wall and to a new position after the piston has assumed its normal retracted position, said spring so cooperating with the body of the piston that it will be placed under tension by the reciprocation of the piston.

5. In apparatus of the class described, a cylinder, a piston reciprocable in said cylinder, and means for rotating said piston from one position to another and comprising spaced spiral teeth on the body of the piston and a cooperating pawl adapted to move from one tooth to another on one stroke of the piston and to engage a tooth on the return stroke.

6. In apparatus of the class described, a cylinder, a piston reciprocable in said cylinder, and means for rotating said piston from one position to another and comprising spaced spiral teeth on the body of the piston and a cooperating leaf spring pawl fixed to the cylinder and adapted to over-run one or more of the teeth on the forward stroke of the piston and to engage a tooth on the return stroke.

W. F. BOLDT.
WALTER R. FREEMAN.